United States Patent [19]
Kingdon et al.

[11] Patent Number: 5,677,851
[45] Date of Patent: Oct. 14, 1997

[54] METHOD AND APPARATUS TO SECURE DIGITAL DIRECTORY OBJECT CHANGES

[75] Inventors: Kevin Kingdon; Randal Earl Childers, both of Orem; DeeAnne Higley, Provo; Dale R. Olds, Sandy, all of Utah

[73] Assignee: Novell, Inc., Orem, Utah

[21] Appl. No.: 357,467

[22] Filed: Dec. 15, 1994

[51] Int. Cl.$^6$ .................................................. H04L 9/00
[52] U.S. Cl. ............................ 364/514 C; 395/200.03
[58] Field of Search .................. 364/514 C; 395/200.01, 395/200.03, 200.09, 600, 712, 200.06, 200.02, 200.13, 683

[56] References Cited

U.S. PATENT DOCUMENTS

| | | | |
|---|---|---|---|
| 5,001,628 | 3/1991 | Johnson et al. | 364/200 |
| 5,136,716 | 8/1992 | Harvey et al. | 395/800 |
| 5,220,604 | 6/1993 | Gasser et al. | 380/23 |
| 5,367,635 | 11/1994 | Bauer et al. | 395/200 |
| 5,367,698 | 11/1994 | Webber et al. | 395/800 |
| 5,388,257 | 2/1995 | Bauer | 395/600 |
| 5,483,652 | 1/1996 | Sudama et al. | 395/600 |
| 5,491,817 | 2/1996 | Gopal et al. | 395/600 |
| 5,495,607 | 2/1996 | Pisello et al. | 395/600 |
| 5,499,343 | 3/1996 | Pettus | 395/200.2 |
| 5,499,358 | 3/1996 | Nevarez | 395/600 |

OTHER PUBLICATIONS

Peter Shaohua Deng, A Dynamic Access Control Model for Object–Oriented System, pp. 159–163, 1993 International Carnahan Conference on Security Technology: Security Technology (Oct. 13–15, 1993).

Min–Shiang Hwang, et al., A Two–Key–Lock–Pair Access Control Method Using Prime Factorization and Time Stamp, pp. 1042–1046, 2334D IEICE Transactions on Information and Systems, vol. E77–D (1944) Sep., No. 9, Tokyo, JP.

Ravi S. Sandhu and Pierangela Samarati, Access Control: Principles and Practice, pp. 40–48, 2460 IEEE Communications Magazine—32 (1944) Sep., No. 9, New York, US.

Prinz, "Representing Authorization Information in the X.500 Directory" 1992.

Bunz et al., "Exchange of Patient Records—Prototype Implementation of a Security Attributes Service in X.500" Nov. 2, 1994.

*Primary Examiner*—Emanuel T. Voeltz
*Assistant Examiner*—Patrick Assouad
*Attorney, Agent, or Firm*—Dinsmore & Shohl LLP

[57] ABSTRACT

A method of providing authoritative access control to computer networks that employs a distributed network directory using a static means of resolving object attributes is disclosed. The method employs the existing directories and an authentication procedure for each server. A first object that is under the physical control of the administrator of one partition of the distributed network directory requests access to a second object that is under the physical control of the administrator of another partition of the distributed network directory. The directory verifies that the access control list of the first object includes the second object. The access control list of the second object is then checked to verify that it includes a reference to the first object as an object that is permitted access to the second object. As a result, access is only granted in response to requests from objects that appear in the access control list of the second object. A method of synchronizing the access control lists based upon an authoritative access control list is also disclosed.

25 Claims, 4 Drawing Sheets

METHOD AND APPARATUS TO SECURE DIGITAL DIRECTORY OBJECT CHANGES

BACKGROUND

The present invention relates to the management of distributed digital network directories, and particularly to securing objects of a distributed digital network directory to promote changes to the object only by those who have been authorized.

Technological advances in microelectronics and digital computing systems have resulted in the proliferation of digital computer networks, enabling the distribution of networking services across a wide range of computers participating in the network and over various communications media. Advances in distributing applications have also resulted in a client-server architecture for applications. Under the architecture, the portions of the application that interact with the user are typically separated from the portions of the application that fulfill client processing requests. Typically, the portions of an application that interact with the user are called client applications or client software, whereas the portions of the application that service requests made by the client applications are called server applications or server software. In a network environment, the client applications and server applications are generally executed on different computers, although servers may be clients as well.

Historically, digital networks in the form of local area networks, a physical collection of personal computers interconnected with network cabling and network interface cards, consisted of a single network server and multiple network clients. To manage which network clients could access the network server, as well as what files, printers, printer queues, and server applications were available to the network clients, the network server maintained information on each of the resources that were attached to the server and the identities of the network clients and users who could use the services of the network server and the scope and nature of the services available to the network clients and users.

As local area networks became more popular, networks grew in size requiring several servers to service the needs of users. With increased size and complexity of networks, came the need for easier management of network servers. Users required access to an increasing number of services that were located on an increasing number of network servers. Several vendors began offering networking servers. Each vendor implemented a different scheme of providing networking services information. In addition, each network server, because of the way the server maintained information about only its networking services still required management of its resources independently of other network servers.

This insular method of maintaining information of networking services fueled research and development of distributed networking directories that span networking servers. Thus far, research has resulted in several potential solutions. Three technologies currently hold greater promise for replacing the large number of insular, idiosyncratic directories that now litter many an enterprise's numerous local-area networks and electronic-mail systems. One of the more popular approaches exploits the X.500 distributed network information directory services protocol developed as published by the CCIT and Open Systems Interconnect consortium.

However, while the X.500 protocol appears to hold the greatest promise to provide a robust, distributed directory, the X.500 protocol has been slow to gain acceptance. The X.500 protocol specification describes a technical framework, interoperability requirements and compliance criteria but does not describe specific implementations. Thus many of the details of implementation have been left up to systems providers.

The X.500 protocol specification describes a distributed directory. The directory provides information services to network clients. The information in the directory can be created, read as well as modified by users who have applicable access rights.

The information stored in the directory is enforced by the schema. The directory is a collection of objects with associated attributes or properties tied together by their relationship to each other. FIG. 1 shows an object called "Computer" with some associated properties, such as owner, operator, status, etc. The values of the properties are not shown in the Figure but an example of a value for "Owner" might be "Provo." Objects in the directory and their names correspond to things that humans relate to when dealing with computers, namely, users, printers, print queues, networks and information. Objects such as countries, organizations, users and computers are objects you might find in the directory as well.

The directory provides information to users by giving users a hierarchical view of all of the information contained in the directory. The hierarchical view is generally in the form of a tree. FIG. 2 shows a directory. Each of the branches and terminating points or leaves represent objects in the directory. Generally, implementations of the directory organize objects in subtrees, partitions or domains. FIG. 2 also shows the directory organized into partitions or domains. Multiple copies of each partition may be stored in the directory. Software schemas define and determine the types of replicas of each partition.

Multiple replicas of a partition are needed to reduce network storage and traffic requirements and speed up directory searches. Replicas are stored in name servers. A name server is a computer in the network, usually a network server. More than one partition can be stored in a name server. Partitions stored in a name server need not be contiguous.

The directory tree provides a logical means of searching for information. The tree is generally patterned after logical groupings such as organizations, organizational units, computers and users. These logical groupings, while extremely useful in helping users find relevant information also creates significant problems in managing the directory.

Each partition forms a major subtree of the directory. Taken together, the partitions form a hierarchical tree of partitions that leads back to a root partition containing the root directory. Where boundaries of two partitions meet, the partition closer to the root is considered superior, and the partition farther from the root is considered subordinate. Thus, FIG. 2, partitions E and C are subordinate to the other partitions.

The present invention solves one of the problems associated with a distributed directory. As the real objects associated with the directory change, the directory must be changed as well. Organizations, organizational units, computers and users all move. Today, the legal department may be reporting through the finance department. Tomorrow, one of the employees of the finance department might be moved to marketing. The day after, one of the employees receives a promotion with new rights and privileges.

As a directory begins to proliferate, more and more name servers will be added to the network. As the directory expands beyond company boundaries, some of the name servers will be under the physical control of others, including other companies, such as competitors. Each of those name servers may have a replica of a partition, several partitions or the entire directory. Because other companies may have physical access to a name server, such companies might choose to tamper with the name server, changing the information of the directory. If such tampering is allowed, the success of distributed digital directories will be severely impacted.

One such type of tampering may occur with directory implementations employing a static means of resolving object attributes. Some systems that maintain the schema in an electromagnetic form use static resolution. Static resolution is employed to decrease network traffic. FIG. 3 compares two systems, one that employs static resolution and one that employs dynamic resolutions. Upon receiving a client request from user Boyd to print to Printer C, a dynamic system searches through random access memory ("RAM") for the object Printer C. Since Boyd is a member of Group A, the dynamic system then searches through each group associated with Printer C. When it reaches Group A, it searches through users associated with Group A until it finds user Boyd. The system then accepts Boyd's print job. The static system simply looks at user Boyd searching for an attribute named Printer C. Once it finds the attribute it accepts Boyd's print job. The dynamic system will be much faster in a small system. The static system will out perform the dynamic system in large systems.

While providing superior performance in large systems, static resolution can introduce a potential security problem. The problem is particularly troublesome in a distributed directory where multiple copies of the directory are kept. FIG. 4 shows a request by user Boyd to print on Printer C. Printer C is in another domain. Printer C is in another company, Company B, which is a competitor of Company A. With a static resolution system, even if user Boyd was not added to Printer C, user Boyd, since he has physical access to name Server A, could without Company B's consent modify the directory schema to add Printer C as a valid attribute and thus print on Printer C. This is true because the static system looks at the attributes associated with the object in question.

SUMMARY OF THE INVENTION

With the present invention the security of a distributed directory employing static object resolution is enhanced. The invention introduces a mechanism to identify an authoritative domain and enforce the security desired by system administrators in physical control of networking objects.

BRIEF DESCRIPTION OF THE DRAWINGS

The present invention may be more fully understood by reference to the following Detailed Description in conjunction with the Drawings, in which.

DETAILED DESCRIPTION OF THE INVENTION

The present embodiment of the invention, Novell's NetWare Directory Service or NDS, supports security that deters persons who may have physical access to name servers from tampering with the objects not in their physical possession. NDS operates in the NetWare network operating system environment.

NetWare NDS employs a static object attribute resolution schema. Each NDS object belongs to a class. Each class has a textual name. There is a class hierarchy. Descending the hierarchy corresponds to increasing specialization. For example, Server is a specialization of a Device, and a Print Server is a specialization of a Server.

The NDS name space is tree structured. Objects at interior nodes of the tree are "container" objects, to which other objects can be subordinate.

The NDS schema is a collection of attribute definitions and class definitions. NDS objects have attributes, whose values can be read and written. Each attribute type has a textual name, and a syntax by which its values are represented. The name is from one to 32 characters (excluding null termination.) It can also have a range of valid values. There are certain other attribute characteristics; for example, some attributes are mandatory while others are not.

With respect to the present invention, if an object references another object in its access control list, the object must contain two attributes name "Security Equals" and "Equivalent To Me." Both are statically resolve object attributes. The Security Equals attribute contains other objects from which the object derives or inherits rights. A user object named Boyd with objects George and Group A its Security Equals attribute list, inherits the rights that George and Group A have for other objects. The "Equivalent To Me" attributes contains an authoritative list of all objects that have security equal to the object in question. Under the present invention, the Equivalent To Me attribute is used as the authoritative attribute for access control of any object.

Figure 1:
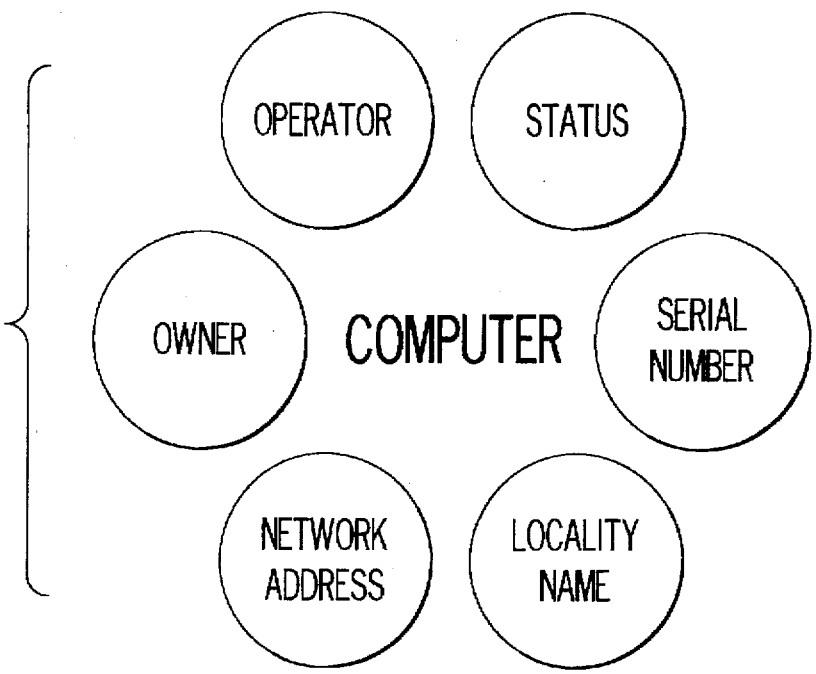
FIG. 1 shows a typical directory object, a computer, with some of its associated attributes.
Figure 2:
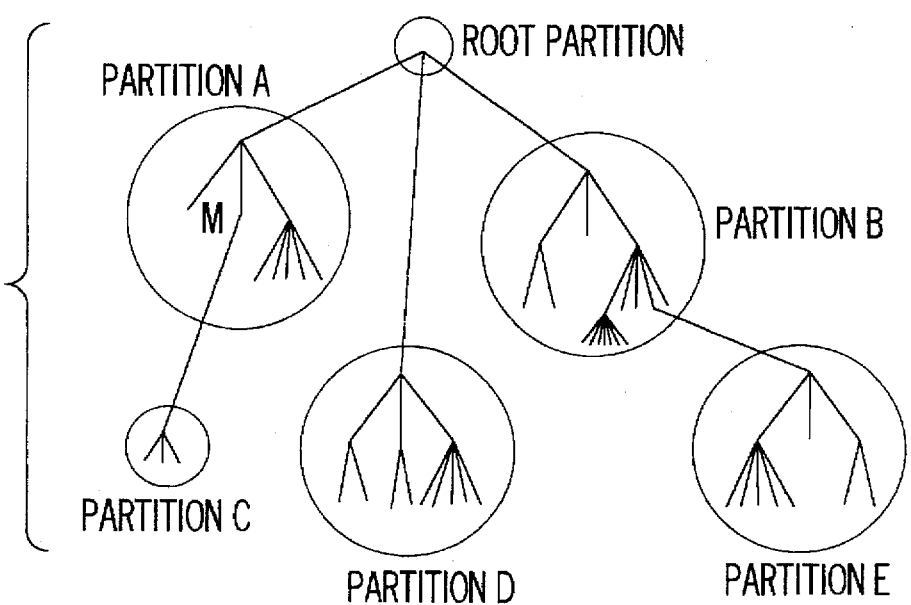
FIG. 2 shows a typical distributed directory hierarchal tree.
Figure 3:
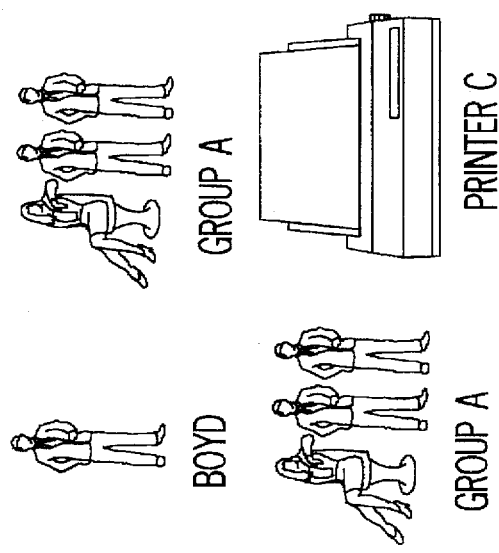
FIG. 3 shows the difference between dynamic and static resolution of object attributes.
Figure 4:
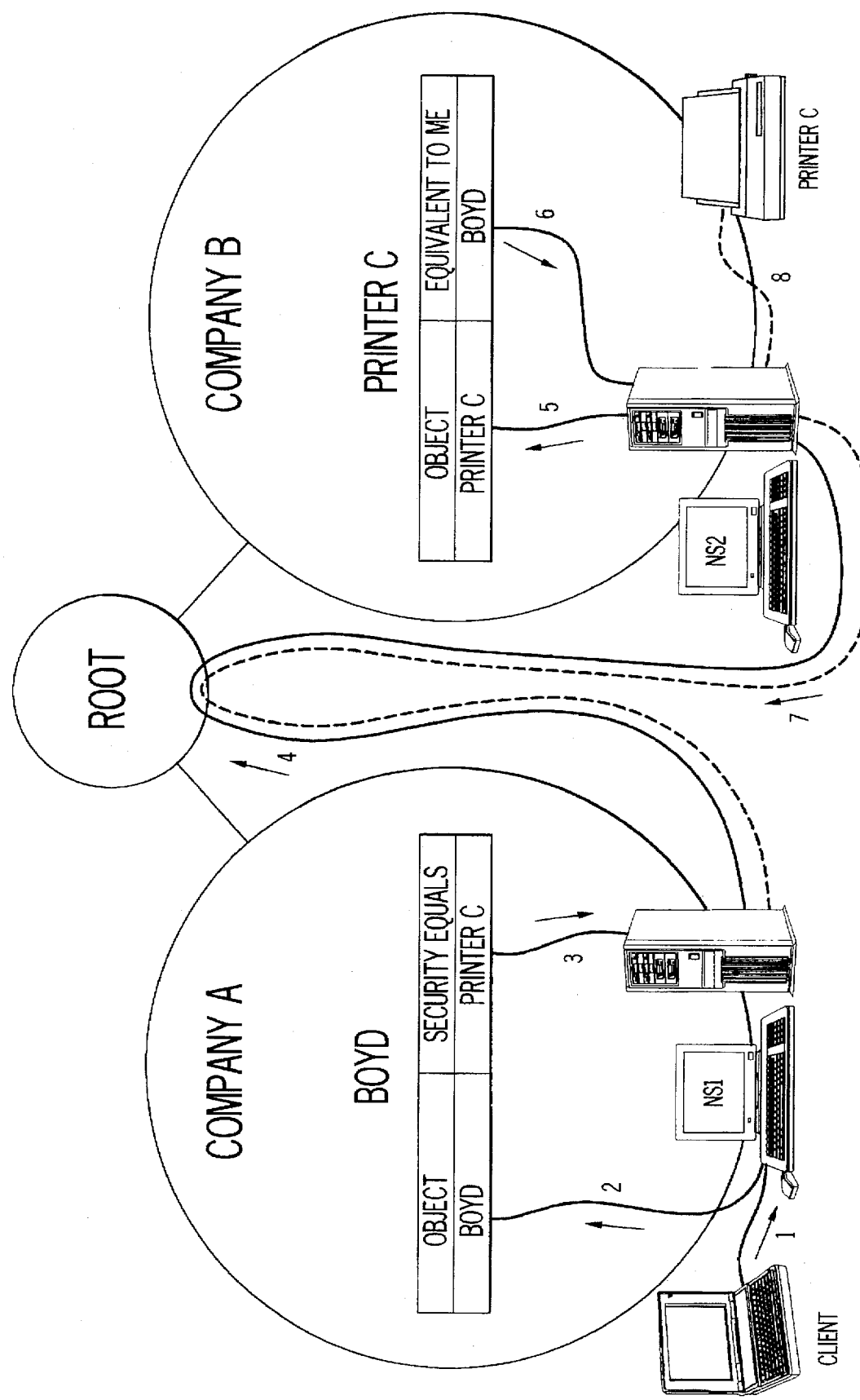
FIG. 4 shows the use of the Security Equals and Equivalent To Me attributes in a distributed directory employing static resolution of object attributes.

FIG. 4 shows how the Security Equals and Equivalent To Me attributes are used within NDS. User Boyd's issues a request to NDS to print on Printer C using a network client-based application running on "CLIENT." In step 1, the application passes the request to name server NS 1 in the form of an NDS protocol request such as "Resolve Name."

Resolve Name is a key operation for a client to get started accessing NDS entries. It takes an object's Distinguished Name and returns "entry IDs" that can be used to access a corresponding NDS entry. By the choice of request parameters, the client indicates various characteristics of the desired entry ID.

In this case, Resolve Name interacts with NDS to identify the distinguished name of printer C, namely O=Company B.OU=Domain B.Printer C, which represents the tree hierarchy where "O" is the organization name, "OU" is the organization unit and "Printer C" is the desired printer. In step 2, NDS looks in the security equivalent list of object Boyd using a function such as "READ." In step 3 READ resolves the Security Equals attribute to return "Printer C." In step 4, NS1 issues an NDS "READ" request to NS2 as the name server for object Printer C. In step 5, READ returns the access control list associated with Equivalent To Me attribute of the Printer C. In step 7, equivalency is determined in the form of a match of the Equivalent To Me and Security Equals attributes. In the final step, NS1 acknowledges the match, which allows user Boyd to print to Printer C in step 8.

Figure 5:
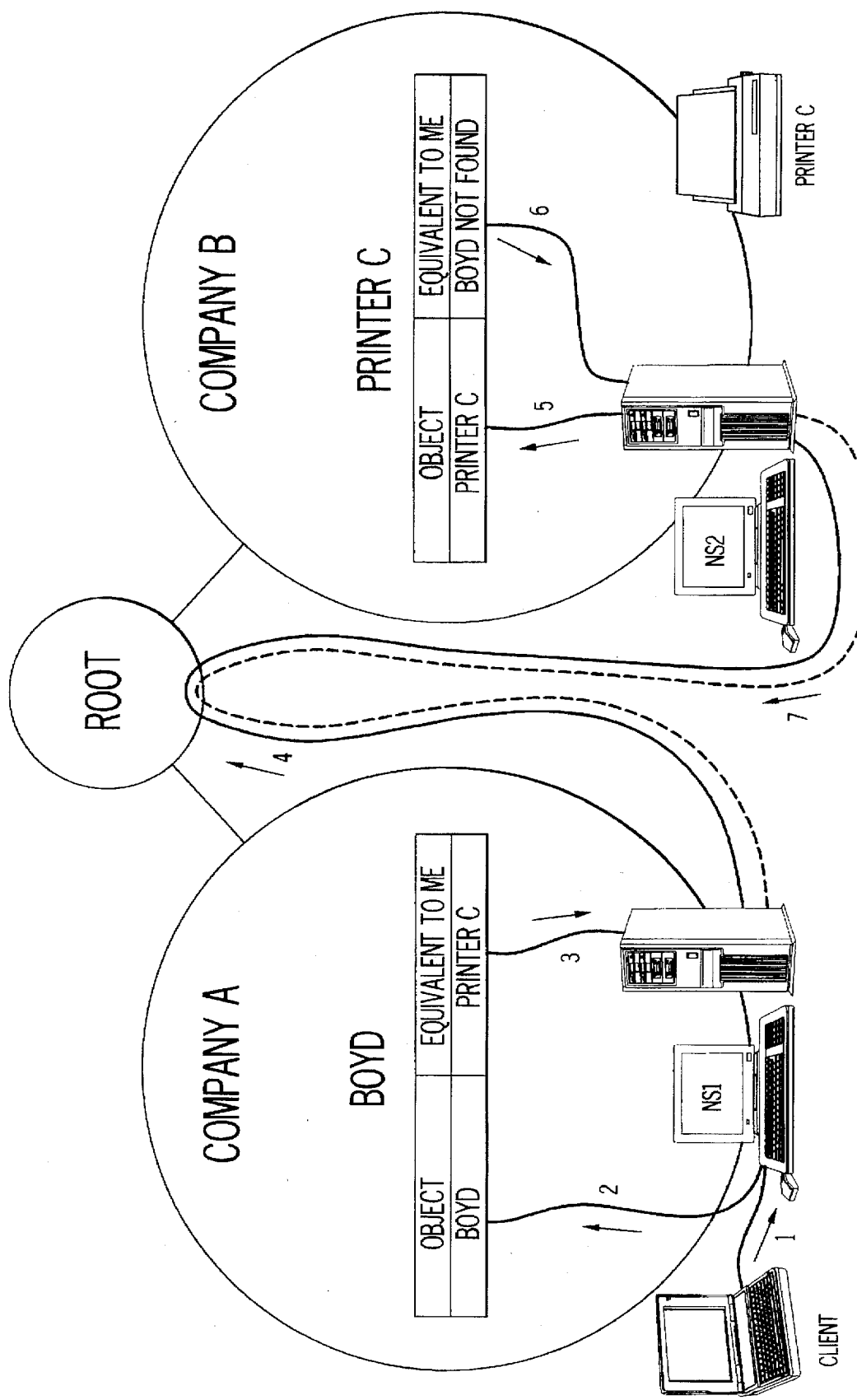
FIG. 5 shows the use of Security Equals and Equivalent To Me attributes in a distributed directory employing static resolution of object attributes where one partition of the directory has been compromised.

While FIG. 4 shows what happens when the Security Equals and Equivalent To Me Attributes match, FIG. 5 shows the method of interaction disclosed by the invention when an attempt to breach NDS security has been made and the attributes do not match. In FIG. 5 someone who has physical access to NS1 has modified the NDS replica of NS1 to include Printer C in object Boyd's Security Equals access control list. In step 1, user Boyd makes a request to print on Printer C through CLIENT. CLIENT packages the request and submits it to NS1 by means of the NDS protocol. In step 2, NS1 checks object Boyd's access control list and in step 3 finds that Printer C in the Security Equals list. In step 4, NS1 issues an NDS READ protocol request to NS2. In step 5, READ returns the access control list of Printer C and finds in step 6 that object Boyd does not have rights to Printer C. In step 7, equivalency is determined in the form of a mismatch of the Equivalent To Me and Security Equals attributes. User Boyd then receives a message that he does not have rights to Printer C.

Synchronization of the Equivalent To Me and Security Equals attributes occurs as follows. When the Equivalent To Me attribute is added to an object, for example in FIG. 4, the Equivalent To Me attribute of Boyd is added to the object Printer C, the following steps are followed:

1. A network client application passes the request to add this attribute value to the server NS2 in the form of an NDS protocol request "Modify Object" (add the value of Boyd to the Equivalent To Me attribute of the object Printer C). Modify Object alters attribute values. Bear in mind that the NDS schema allows most attributes to have multiple values. The Modify Object request includes a list of individual changes, all applying to the same entry. There may be several kinds of individual changes, each adding or deleting an attribute value.
2. NS2 verifies the existence of the object Boyd by making the request Resolve Name.
3. NS2 verifies the access rights of the client to add this attribute value.
4. NS2 adds the attribute value of Boyd to Printer C's Equivalent To Me attribute.
5. NS2 issues an NDS request in the form of CHECK SEV to NS1 as the name server for Boyd. CHECK SEV simply checks to verify the security equivalence of an object.
6. NS1 receives the CHECK SEV request and notes that NS2 suggests that a change has been made to the Equivalent To Me attribute of Printer C and that Boyd was involved in the change.
7. NS1 issues a request in the form of Resolve Name for the name of Printer C.
8. NS1 issues a request in the form of Kead Entry Info to determine the partition root of printer C's object. NDS uses two operations to obtain information about an object, Read Entry Info and Read. Of these, Read obtains values of the object's attributes, while Read Entry Info obtains other values associated with the object in the NDS database. Using Read Entry Info, for example, a client can read an entry's modification time stamp, or (to walk the name tree upward) the entry ID of its containing parent.
9. NS1 issues a request in the form of Read to determine if NS2 holds a replica of Primer C's object.
10. NS1 issues a request in the form of Compare to verify the presence or absence of Boyd's object in Printer C's Equivalent To Me attribute list. The Compare operation reports whether a client-supplied value is one of the entry's values for an attribute identified in the request. A common use is determining if a user is a member of a specific group.
11. NS1 modifies Boyd's security equivalent attribute based on the presence or absence of Boyd's object in Printer C's Equivalent To Me attribute list (ifpresent, adds Primer C to Boyd's Security Equals attribute; if not present, removes Printer C from Boyd's Security Equals attribute).

With the present method of providing security for objects residing on potentially hostile partitions of a distributed directory, those in physical possession of the objects, such as computers, primers, print servers, fax servers, can establish authoritative access control lists that the entire directory will need to satisfy before access is available.

Although one embodiment of the invention has been illustrated and described, various modifications and changes may be made by those skilled in the art without departing from the spirit and scope of the invention.

We claim:

1. A method of resolving object attributes in a computer system, wherein a first distributed directory object and a second distributed directory object each have at least one associated attribute, comprising the steps of:
    a) determining an associated attribute of the first object;
    b) checking that the second object is included in the associated attribute of the first object;
    c) determining an associated attribute of the second object; and
    d) checking that the first object is included in the associated attribute of the second object.

2. A method as recited in claim 1, further comprising the step of notifying that the attributes of the first and second objects are not synchronized if at least one of the following events occurs:
    a) the second object is not included in the associated attribute of the first object; or
    b) the first object is not included in the associated attribute of the second object.

3. A method as recited in claim 1, further comprising the step of allowing the first object to access the second object if:
    a) the second object is included in the associated attribute of the first object; and
    b) the first object is included in the associated attribute of the second object.

4. A method as recited in claim 1, wherein the first and second objects employ static resolution.

5. A method as recited in claim 1, wherein the associated attribute of the first object is a Security Equals attribute, and the associated attribute of the second object is an Equivalent To Me attribute.

6. A method as recited in claim 1, wherein the first and second objects are contained within different partitions in a distributed directory.

7. A method as recited in claim 6, wherein the different partitions are maintained by different servers.

8. A method of synchronizing an associated attribute of a first distributed directory object and an associated attribute of a second distributed directory object in a computer system, comprising the steps of:
    a) receiving a request to modify the associated attribute of the second object;
    b) verifying that the associated attribute of the second object may be modified;

c) modifying the associated attribute of the second object; and d) synchronizing the associated attribute of the first object and the associated attribute of the second object by modifying the associated attribute of the first object to correspond to the modified associated attribute of the second object.

9. A method as recited in claim 8, further comprising after Step (c) and before Step (d) the step of verifying that the associated attribute of the second object has been modified.

10. A method as recited in claim 8, wherein the act of modifying an associated attribute includes one or more of the following steps:

a) adding a value to such an attribute;

b) deleting a value to such an attribute; or c) changing a value to such an attribute.

11. A method as recited in claim 8, wherein the step of modifying the associated attribute of the first object to correspond to the modified associated attribute of the second object is achieved by adding the second object to the attribute of the first object if the first attribute was added to the attribute of the second object.

12. A method as recited in claim 8, wherein the step of modifying the associated attribute of the first object to correspond to the modified associated attribute of the second object is achieved by deleting the second object from the attribute of the first object if the first object was deleted from the attribute of the second object.

13. A method as recited in claim 8, wherein the first and second objects are contained within different partitions in a distributed directory.

14. A method as recited in claim 13, wherein the different partitions are maintained by different servers.

15. A method of verifying in a computer system that a first distributed directory object has authorization to access a second distributed directory object wherein the first object and the second object each have at least one associated attribute, the method comprising the steps of:

a) receiving a request for the first object to access the second object;

b) determining the associated attribute of the first object and the associated attribute of the second object;

c) checking that the second object is included in the associated attribute of the first object and that the first object is included in the associated attribute of the second object; and d) verifying that the first object has authorization to access the second object if:

i. the second object is included in the associated attribute of the first object; and ii. the first object is included in the associated attribute of the second object.

16. A method as recited in claim 15, further comprising the step of: notifying that an unauthorized access to the second object was attempted if one of the following events occurs:

a) the second object is not included in the associated attribute of the first object; or b) the first object is not included in the associated attribute of the second object.

17. A method as recited in claim 15, wherein the first and second objects employ a static resolution to resolve object attributes.

18. A method as recited in claim 15, wherein the associated attribute of the first object is a Security Equals attribute, and the associated attribute of the second object is an Equivalent to Me attribute.

19. A method as recited in claim 15, wherein the first and second objects are contained within different partitions in a distributed directory.

20. A method as recited in claim 19, wherein the different partitions are maintained by different servers.

21. A method as recited in claim 15, wherein the computer system is a client/server network.

22. A method as recited in claim 21, wherein a first name server maintains the first object and a second name server maintains the second object.

23. A computer system comprising a first computer and a second computer which are capable of transmitting and receiving information from one another, which first and second computers access a distributed directory having a plurality of objects, wherein the first computer maintains a first distributed directory object in the distributed directory and the second computer maintains a second distributed directory object in the distributed directory, and wherein the first object has a first associated attribute which references at least the second object and the second object has a second associated attribute which references at least the first object.

24. A computer readable medium comprising a program for resolving object attributes in a distributed directory having a first distributed directory object and a second distributed directory object, wherein each of said objects includes at least one associated attributed, the program being capable of resolving object attributes by performing the steps of:

a) receiving a request for the first object to access the second object;

b) determining the associated attribute of the first object and the associated attribute of the second object;

c) checking that the second object is included in the associated attribute of the first object and that the first object is included in the associated attribute of the second object; and d) verifying that the first object has authorization to access the second object if:

i. the second object is included in the associated attribute of the first object; and ii. the first object is included in the associated attribute of the second object.

25. A computer system accessing a distributed directory that includes a plurality of objects having associated attributes, the computer system comprising:

a) means for receiving a request for a first distributed directory object in the distributed directory to access a second distributed directory object in the distributed directory;

b) means for determining an associated attribute of the first object and an associated attribute of the second object;

c) means for checking that the second object is included in the associated attribute of the first object and that the first object is included in the associated attribute of the second object; and d) means for verifying that the first object has authorization to access the second object if:

i. the second object is included in the associated attribute of the first object; and ii. the first object is included in the associated attribute of the second object.

* * * * *